(12) United States Patent
Hoefflin et al.

(10) Patent No.: US 10,986,718 B2
(45) Date of Patent: Apr. 20, 2021

(54) METHOD FOR SETTING UP A LIGHTING SYSTEM AND LAMP FOR INCLUSION IN A LIGHTING SYSTEM

(71) Applicant: OSRAM GmbH, Munich (DE)

(72) Inventors: Eberhard Hoefflin, Herbrechtingen (DE); Herbert Ernst, Weilheim (DE); Michael Eschey, Wehringen (DE); Holger Sacher, Augsburg (DE); Bernhard Siessegger, Unterschleissheim (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/081,428

(22) PCT Filed: Feb. 28, 2017

(86) PCT No.: PCT/EP2017/054588
§ 371 (c)(1),
(2) Date: Aug. 31, 2018

(87) PCT Pub. No.: WO2017/148909
PCT Pub. Date: Sep. 8, 2017

(65) Prior Publication Data
US 2019/0045605 A1 Feb. 7, 2019

(30) Foreign Application Priority Data

Mar. 3, 2016 (DE) ..................... 10 2016 203 514.2

(51) Int. Cl.
*H05B 47/19* (2020.01)
*H05B 47/11* (2020.01)
*H05B 47/105* (2020.01)

(52) U.S. Cl.
CPC ........... *H05B 47/19* (2020.01); *H05B 47/105* (2020.01); *H05B 47/11* (2020.01)

(58) Field of Classification Search
CPC ............ H05B 37/0218; H05B 37/0227; H05B 37/0272
See application file for complete search history.

(56) References Cited

U.S. PATENT DOCUMENTS

| 2006/0071780 A1 | 4/2006 | McFarland | |
|---|---|---|---|
| 2013/0221203 A1* | 8/2013 | Barrilleaux | ........... G01J 1/0403 250/208.2 |

(Continued)

FOREIGN PATENT DOCUMENTS

WO    2006136985 A1    12/2006

OTHER PUBLICATIONS

German Search Report based on application No. 10 2016 203 514.2 (8 pages) dated Nov. 8, 2016 (for reference purpose only).

(Continued)

*Primary Examiner* — Alexander H Taningco
*Assistant Examiner* — Pedro C Fernandez
(74) *Attorney, Agent, or Firm* — Viering Jentschura & Partner MBB

(57) ABSTRACT

A method for setting up a lighting system comprising at least two luminaires, which are part of a network and each having a unique network address, wherein each luminaire has at least one sensor and one actuator, characterized by the steps of measuring the relative distance between respectively two luminaires by reading at least one sensor of the luminaire while simultaneously activating at least one actuator of the other luminaire, producing at least one data record, wherein each data record contains the network address of both luminaires and the relative distance of the luminaires from one another, and merging the data records to form a geo-localized network list and comparing the network list to a floorplan underlying the lighting system to determine the physical location of each luminaire.

16 Claims, 14 Drawing Sheets

(56) References Cited

U.S. PATENT DOCUMENTS

| | | | | |
|---|---|---|---|---|
| 2014/0232299 A1* | 8/2014 | Wang | ............... | H05B 45/00 |
| | | | | 315/362 |
| 2015/0115805 A1* | 4/2015 | Henig | ............... | H05B 37/0227 |
| | | | | 315/152 |
| 2015/0195883 A1* | 7/2015 | Harris | ............... | H04B 47/19 |
| | | | | 315/155 |
| 2015/0359073 A1* | 12/2015 | Van De Sluis | ............... | H05B 37/0272 |
| | | | | 315/153 |
| 2016/0091217 A1* | 3/2016 | Verberkt | ............... | F24F 11/30 |
| | | | | 700/276 |
| 2016/0345414 A1* | 11/2016 | Nolan | ............... | G08C 17/02 |

OTHER PUBLICATIONS

International Search Report based on application No. PCT/EP2017/054588 (15 pages) dated May 11, 2017 (for reference purpose only).

\* cited by examiner

METHOD FOR SETTING UP A LIGHTING SYSTEM AND LAMP FOR INCLUSION IN A LIGHTING SYSTEM

CROSS-REFERENCE TO RELATED APPLICATION

The present application is a national stage entry according to 35 U.S.C. § 371 of PCT application No.: PCT/EP2017/054588 filed on Feb. 28, 2017, which claims priority from German Patent Application Serial No.: 10 2016 203 514.2 which was filed Mar. 3, 2016, and is incorporated herein by reference in its entirety and for all purposes.

TECHNICAL FIELD

The description relates to relatively large lighting systems, e.g. in office buildings or department stores, and a method for setting these up. The description likewise relates to luminaires that are used in such lighting systems.

BACKGROUND

The description proceeds from a method for setting up a lighting system and a luminaire for inclusion in a lighting system.

Large lighting installations, e.g., in office buildings or department stores, already have been fully networked for a relatively long time and they are controlled by a central lighting control system. A problem in these installations is that after the installation thereof, e.g., in a new build or when refitting the lighting installation, the assignment of the various appliances in relation to the installation location is unknown. Although each appliance has a unique address after installation, by means of which it may be addressed by the network, the physical position at which the appliance was installed is unknown. However, this is essential to the lighting control system as it otherwise cannot form spatially associated groups or the like. Therefore, the lighting system is commissioned after installation, i.e., a physical installation location is assigned to each luminaire and each sensor, etc., and this information is made accessible to the lighting control system.

In known systems, this process is carried out by hand since the known systems are not sufficiently networked in order to be able to carry out such commissioning automatically. By way of non-limiting example, known lighting control systems are based on the DALI industrial standard, in which up to 64 appliances may be addressed via a common bus. To this end, the lighting control system allocates the 64 addresses in succession and sets an action for each address, e.g., lighting up of a luminaire for identification purposes. In the case of sensors, the procedure is more complicated; here, a hand-held appliance, e.g., a torch, must be used to successively irradiate each sensor so that the lighting control system may assign the sensor to the respective network address.

In the case of a relatively large lighting installation, this is an outlay that cannot be underestimated and that is correspondingly expensive.

SUMMARY

It is an object of the description to specify a method for setting up a lighting system and a luminaire for inclusion in a lighting system, which may be set up without any manual configuration where possible.

According to the description, the solution may be achieved by a method for setting up a lighting system having at least two luminaires, which are part of a network and each have a unique network address, wherein the luminaires each have at least one sensor and at least one actuator, characterized by the steps of measuring the relative distance between respectively two luminaires by reading at least one sensor of a luminaire while simultaneously activating at least one actuator of the other luminaire, producing at least one data record, wherein each data record contains the network address of both luminaires, the sensor/actuator pairing used for the measurement and the relative distance, merging the data records to form a geo-localized network list and comparing the network list to a floorplan underlying the lighting system in order to determine the physical location of each luminaire.

An advantage of the method is that it may run completely independently after installing the light installation and it requires no manual interaction. The available resources in the luminaires and in the lighting system are used ideally in order to realize a setup process operating completely independently. Here, all measurable boundary conditions are used in order to be able to bring about the setup quickly and reliably.

In a non-limiting embodiment of the method, subsections are formed in the case of a multiplicity of luminaires, with a wiring diagram of the luminaires, sensors and actuators being available for each subsection. Information collected during the installation is therefore advantageously exploited and used for a particularly fast and reliable setup of the lighting installation.

In a further non-limiting embodiment, the luminaire has a network switch, the sensors and actuators assigned to said luminaire being connected to said network switch. The network switch may advantageously be used to query the assignment of the sensors and the actuators to the luminaire. Furthermore, it significantly simplifies the wiring of the lighting system since it is only necessary to lay network cables from a PoE switch to the luminaires.

For measuring the distance between two luminaires in a further non-limiting embodiment, at least one actuator of the luminaire is operated while the sensors of the remaining luminaires measure simultaneously and the relative distance between two luminaires is calculated from the measurement result by means of data fusion. The measurement results of all addressed luminaires may contribute to calculating the distance between two of the addressed luminaires. To this end, all measurement results are evaluated together such that the schematic layout of the luminaires among themselves can be created on the basis of the measurement values. Adjacent luminaires may be localized here and the distance may be established by way of the measurement results of the sensors.

In a further configuration of the method, the ambient brightness is incorporated in the calculation during the light measurement in order to be able to determine a measure for the proximity of the luminaire to a window. Using this measure, known boundary conditions are advantageously also used for establishing the switching of the light installation. Since windows and doors are usually plotted in a floorplan, the measurement may provide information about which addressed luminaires may be found in the proximity of windows. This is advantageous when creating the geo-localized network plan.

For determining the distance in another advantageous configuration, a light sensor and a microphone are operated as sensors and at least one light module and a loudspeaker are operated as actuators in order to be able to determine the relative distance between two luminaires by way of a time-of-flight difference between the light signal and sound signal. Advantageously, the distance may be established particularly accurately using this measure since this time-of-flight difference may be measured well and easily and an accurate determination of the distance between actuators and sensors is possible as a result of the great difference in speed between light and sound.

In the case of luminaires with only a few different sensors and actuators the data may not suffice to be able to reliably determine where a luminaire with a certain network address is installed. Therefore, an extended method is carried out according to the invention in the case of an insufficient number of evaluable data records, in which additional data records are produced manually with the aid of a mobile terminal with sensors and actuators in order to be able to calculate the necessary relations. Sadly, this is sometimes necessary since the configuration of the lighting system cannot be completed otherwise. However, it is stressed here that this is only the case for luminaires with very spartan equipment. In the case of hardware equipment as usually comprised by networked PoE luminaires, a manual post-configuration will be able to be dispensed with in the large majority of cases.

Should a manual post-configuration become necessary, the physical location of the mobile terminal for a measurement is determined manually in relation to the floorplan. This makes the manual post-configuration fast and simple since the configuration may normally be completed quickly by the measurement at a few different locations on the floor.

According to the description, the object may also achieved by a luminaire for inclusion in a lighting system, wherein the luminaire is included in the network with in each case a unique network address, wherein the luminaire carries out the above-described method for setting up the lighting system together with the further luminaires in the lighting system, especially with the further luminaires on the same floor. If the luminaires are advantageously set up for carrying out the method, the lighting installation may be configured easily and with little outlay. Particularly in the case of a luminaire with an adequate number of sensors and actuators, the setup may be implemented automatically and without manual intervention, saving much work and costs.

It is particularly simple to install the luminaire in the lighting system if the luminaire is included in the network via a network line and it simultaneously receives the power for operation via the network line. This dispenses with connecting the luminaire to the power grid which must be carried out by trained specialists in most countries. By way of the advantageous provision of energy via the network line, the luminaire may be installed easily and cost-effectively by anyone since the network line only carries protective extra-low voltage.

In a non-limiting embodiment, the luminaire has a network switch, at which components assigned to the luminaire, such as sensors and actuators, are connected and addressable via the network. This may be advantageous in that a multiplicity of sensors and actuators may be connected using only one network line and the installation of the lighting system becomes significantly easier.

Sensors may be brightness sensors, radio reception modules, microphones or cameras. These sensors are particularly suitable for the automatic setup and they therefore represent very advantageous equipment of the luminaire.

Likewise, the actuators are light modules, radio transmitters or loudspeakers. These actuators, in turn, likewise have excellent suitability for the automatic setup and they are ideally combinable with the aforementioned sensors such that a particularly simple and exact setup of the lighting installation may be advantageously implemented with these two groups.

In a further non-limiting embodiment, the radio reception modules and radio transmitters form a wireless LAN access point pursuant to the IEEE 802.11 standard or a Zigbee module pursuant to the IEEE 802.15.4 standard or a Bluetooth module pursuant to the IEEE 802.15 standard. Hence, the use value of the luminaire is advantageously increased and these constellations all contribute to a faster and more accurate setup of the lighting system since a good and accurate measurement of the distance between two luminaires is advantageously implementable therewith.

Further advantageous developments and configurations of the method according to the invention for setting up a lighting system and of the luminaire according to the invention for inclusion in a lighting system emerge from further dependent claims and from the following description.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

A non-limiting embodiment of the lighting installation unifies and simplifies the wiring of the luminaires by a solution which houses the power supply and the network line in a common supply line. An Ethernet may be used as a network and an Ethernet line is used as a network line and the power supply is brought about by way of so-called "power over Ethernet (PoE)". Hence, an Ethernet line is required as only supply line, greatly simplifying the wiring. Additionally, these lines do not carry voltages that pose a risk to humans, which is why specialists are no longer required for wiring.

In general, English specialist terms are used below in order to clearly and unambiguously describe the non-limiting embodiment. The specialist terms are briefly explained below:

PoE (power over Ethernet) is a method of impressing a DC voltage into the network line in order to be able to bring about the power supply (commonly also referred to as voltage supply or current supply) via the network line. The DC voltage is a protective extra-low voltage and therefore not dangerous to humans in the case of contact. Therefore, no particular precautions have to be taken during the installation; the installation need not be carried out by trained staff.

A Wi-Fi access point refers to a wireless LAN access point, i.e., an access point to a wireless network connection.

A PoE switch refers to a network switch that is a PoE injector at the same time, i.e., simultaneously impresses the DC voltage onto the network line. To this end, the PoE switch 2 has a high-performance power unit fed by the power grid 4.

A MAC address is a physical address of an appliance allowing it to be addressed in a LAN network. The MAC address is set in the IEEE 802.3 standard for Ethernet.

A lighting control system denotes an overarching system in which all data are merged and in which the method described below is also carried out. Here, conventionally, the lighting control system 3 may be a central system in an installations room, as a non-limiting example. However, in principle, the lighting control system is only a program running on an operating system. Therefore, it is also conceivable for the lighting control system to be implemented in one of the luminaires 1, which then, as it were, acts as a "master" luminaire. By way of the Wi-Fi functionality of the luminaire, the lighting control system is then able to communicate with mobile terminals such as smartphones or tablets, which then serve as an administration interface.

A Bluetooth beacon is a small appliance provided for indoor navigation, which continuously transmits its position or an identification code via Bluetooth. By way of non-limiting example, appliances may be compatible with the proprietary iBeacon standard. As it were, a Bluetooth beacon is a radio beacon and its application is similar to that of navigation in aviation.

Figure 1:
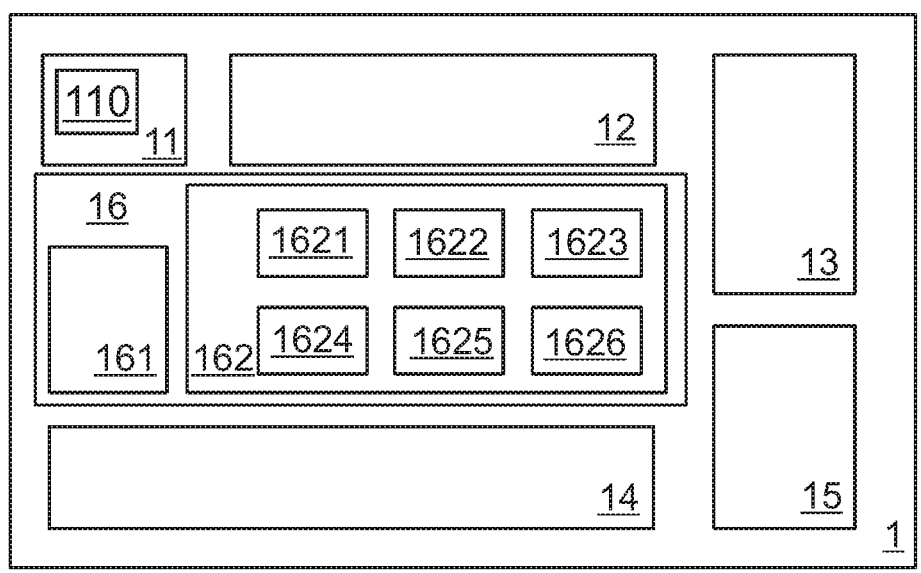
FIG. 1 shows a non-limiting embodiment of a networked luminaire, which obtains its operating power via the network line.

FIG. 1 shows a non-limiting embodiment of a networked luminaire, which obtains its operating power via the network line. The luminaire 1 has a network connector 11, PoE-capable (power-over-Ethernet-capable). In order to be able to make sensors and actuators in the luminaire accessible via the network, the network interface has a network switch 110, to which the sensors and actuators may be connected. In order to extract operating power from the network line and in order to be able to provide an internal power supply, a power supply 12 is provided. The luminaire 1 has at least one LED module 13, which, in turn, may have optics and a driver for the LEDs. Furthermore, the luminaire 1 has actuators 14. In the non-limiting embodiment, actuators are a loudspeaker which may be used, as a non-limiting example, as a hands-free device in a conference room. A Bluetooth beacon for indoor positioning likewise may be provided as an actuator. Of course, the at least one LED module is likewise an actuator in principle; however, this is treated separately on account of the nature of the luminaire. However, the LED module 13 could also be conceived to be an actuator 14.

Furthermore, the luminaire 1 has one or more sensors 15. In the non-limiting embodiment, provision is made of a light sensor, a microphone and a video camera for detecting presence. However, other sensors may also be provided, such as air purity sensors, temperature sensors, pressure sensors or the like.

The luminaire 1 furthermore has a data processing unit 16. In principle, the data processing unit 16 is a computer which includes a Wi-Fi access point, also referred to as WLAN access point, in this case. The data processing unit 16 operates using an operating system 162, which works through the processes simultaneously and with a predetermined priority. Here, OpenWRT is used as an operating system. This is a LINUX-based embedded operating system, which was adapted specifically to routers and to Wi-Fi access points. However, in principle, any other suitable operating system may be used.

The operating system 162 brings about the power regulation 1621 of the luminaire. In the case of a plurality of used sensors, it deals with the processing 1624 of the sensor data and carries out a sensor fusion 1622 in order to adapt and unify the sensor data. The operating system 16 is also responsible for management 1623 of the Ethernet interface 11. The operation 1625 and the actuation of the Wi-Fi access point 161 are also included in the tasks of the operating system 16. Furthermore, the operating system 16 is also responsible for controlling the light and may process external light control commands and may report sensor data and actuator states.

Figure 2:
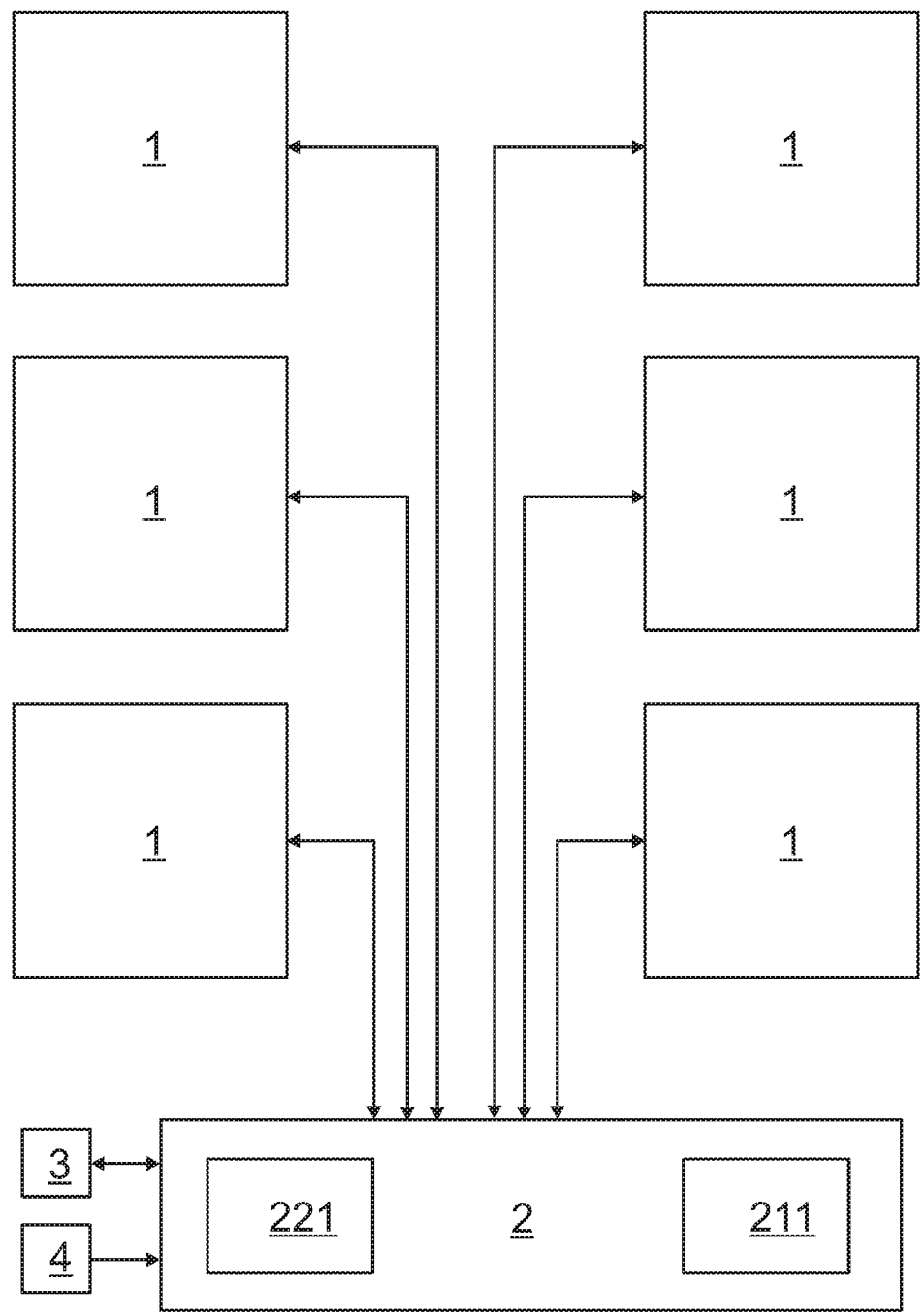
FIG. 2 shows schematic wiring of the luminaire from FIG. 1 in a lighting system.

FIG. 2 shows a schematic wiring of the luminaires 1. Here, for technical reasons, only approximately 6 to 8 luminaires may be supplied with power in each case by a passively cooled PoE switch 2. Since the PoE switch is installed in the dropped ceiling, there is a demand for it to be cooled passively. Passive cooling, in turn, restricts the power density of the associated power unit and hence its power for a given housing size of the switch. This leads to the restriction of only being able to supply 6 to 8 luminaires using one PoE switch. For each PoE port line, the PoE switch 2 has an injector 211, which impresses a DC voltage into the network line of the port. Consequently, the port line supplies the luminaires both with power and with information via the network. The injectors themselves require a power supply in the form of a power unit 221. Since the power unit 211 must supply the total power for all 6 luminaires 1, it is necessary to have a correspondingly powerful design.

In an alternative non-limiting embodiment, no PoE switch 2 installed in the dropped ceiling is used; instead, use is made of a server version installed in an installations room or server room on the floor. No passive cooling is provided here; therefore, the PoE switches 2 may be dimensioned to be significantly more powerful and provide power to very many luminaires 1. A disadvantage of the solution lies in the long line length of the supply lines to the luminaires 1, which leads to increased losses on account of the low copper component in the network cables. Here, the non-limiting embodiment with the PoE switch 2 installed in the dropped ceiling is better on balance thanks to the shorter supply lines.

Figure 3:
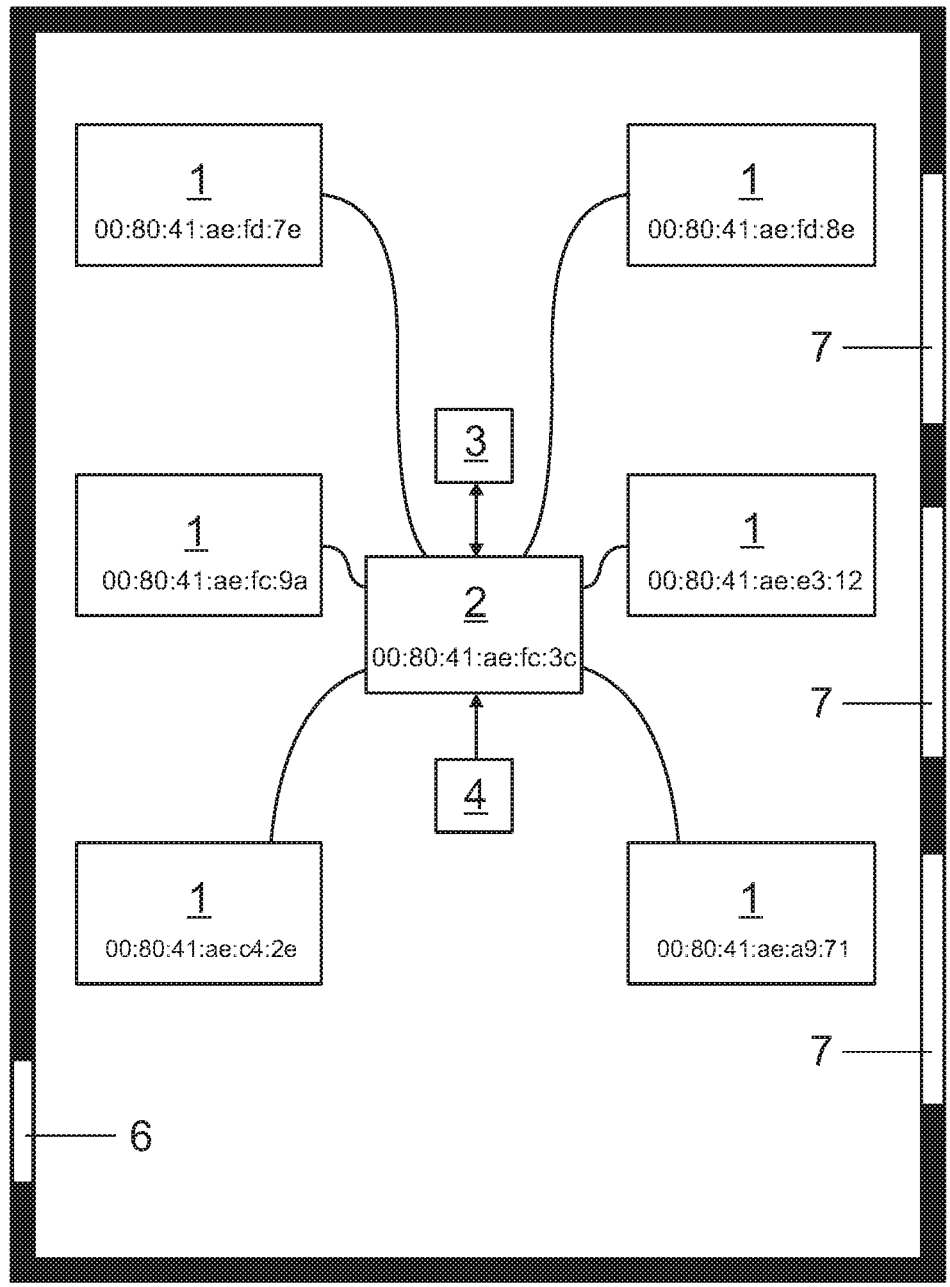
FIG. 3 shows typical wiring of a lighting system, in an office, for example, according to a non-limiting embodiment.

FIG. 3 shows typical wiring of a lighting system, as a non-limiting example, in an office. The office has a door 6 and windows 7. 6 luminaires 1 are installed in the room, said luminaires being supplied with power and information by a PoE switch 2. The PoE switch 2 is controlled, in turn, by a lighting control system 2 and supplied with power by the power supply network 4. Each of the luminaires 1 has a unique network address, known to the lighting control system 2. The network addresses of the connected appliances may be queried in terms of software and may be stored automatically into the lighting control system 2. The network address of the luminaire may be the MAC address thereof, by way of non-limiting example.

Figure 4:
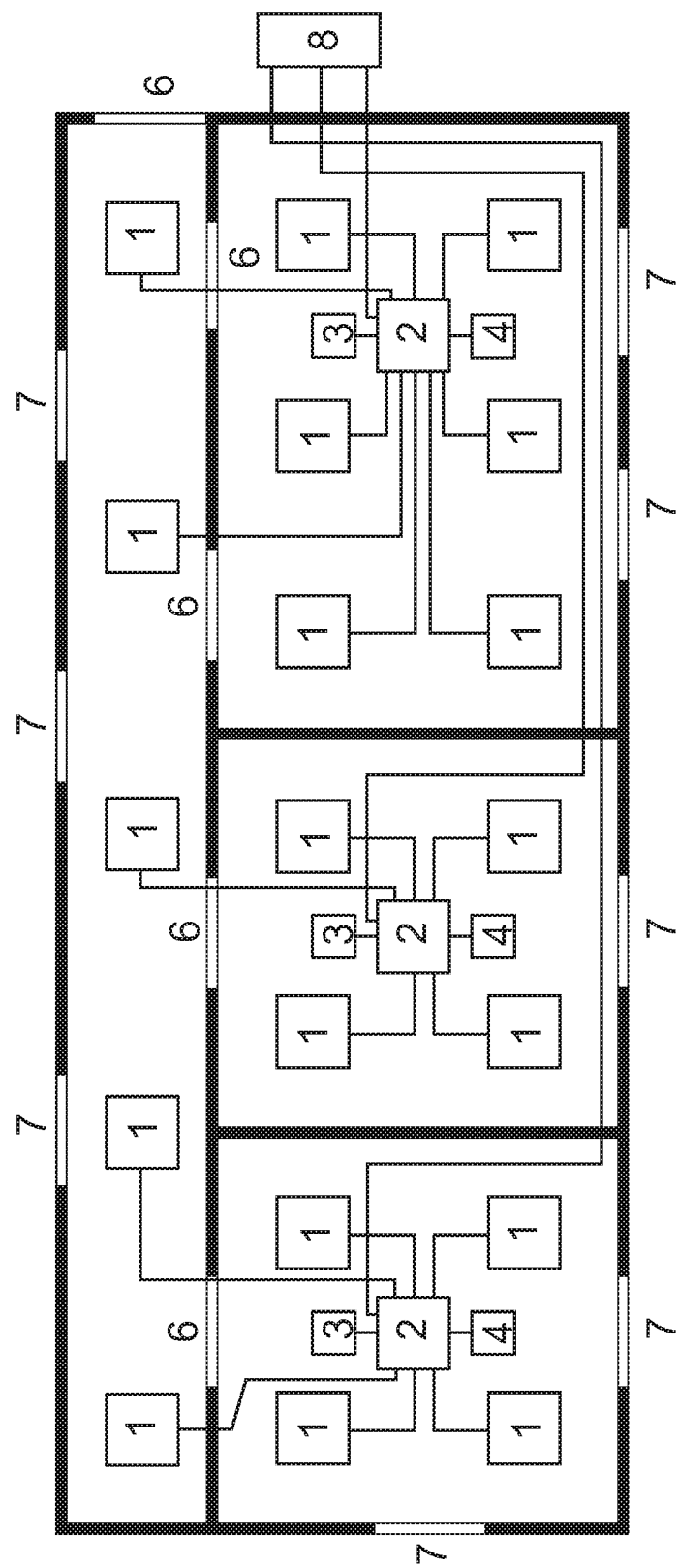
FIG. 4 shows typical wiring of a lighting system on a floor of a building according to a non-limiting embodiment.

A problem arising in a new installation is that the connection of the PoE switches 2 and of the luminaires 1 on the PoE switch 2 was random. Although the lighting control system may now query and store the MAC addresses of all connected luminaires and PoE switches, which PoE switch 2 is situated in what room and which luminaires may be found in this room is not yet known at the outset. FIG. 4 shows such a situation for a floor in an exemplary manner. The assignment of addresses to the positions is not known for all luminaires 1 and PoE switches 2 situated in the rooms, which are ultimately connected to a floor switch 8, and this must be established. This now is where the proposed method begins. Since the PoE switches may be queried individually by way of the dedicated MAC address thereof (here, e.g., the address 00:80:41:ae:fc:3c), the lighting control system 3 is able to query which luminaires are connected to this switch. Now, by way of non-limiting example, the switch thus reports the six MAC addresses of the six connected luminaires. A multiplicity of PoE switches will be situated in a relatively large building, said PoE switches now being partitioned thus into partial networks in order to make the following process simpler and easier to overview. In practical terms, the luminaires connected to a PoE switch 2 are almost always, or at least very often, installed in a room together with the PoE switch. In certain circumstances, these PoE switches could be connected, in turn, to an overarching switch 8, responsible for, e.g., a floor or part of the floor. Often, the cabling of the latter is known in turn, or it may likewise be queried by software. A start may likewise be made here and all PoE switches and associated luminaires, which are connected to such a floor switch 8, may be considered to be a partial network.

Now, a number of data records are generated in a subsequent step, wherein each data record contains the information of two luminaires 1, the employed sensor-actuator pair and the relative distance between these two luminaires 1. This information is generated automatically by virtue of the network capability of the luminaires 1 being exploited. To this end, some or all actuators 14, including the LED modules 13, and some or all sensors 15 are used to find the neighborhood relations of the luminaires 1 amongst themselves.

To this end, one of the luminaires may be put into a blinking mode of operation, by way of non-limiting example, while all other luminaires are deactivated and only receive with their sensors. Initially, blinking services for delimitation from extraneous light, for example if the luminaire is situated in the vicinity of a window. However, blinking need not only serve for delimitation from extraneous light but may also contain a more in-depth functionality. If the blinking pattern is adjustable, each actuator may be registered uniquely by the blinking frequency and it is possible, by way of non-limiting example, to simultaneously activate a plurality of actuators and identify these in parallel. This is particularly expedient if the sensors are video cameras which are able to record a plurality of blinking patterns simultaneously and assign these via an algorithm. In particular, it is possible to make a distinction between the actuator and a possibly PWM-dimmed extraneous luminaire in the vicinity. The blinking pattern need not be regular either but may represent digital data. Thus, the address (MAC address) of the luminaire, by way of non-limiting example, may be transmitted via the blinking pattern and thus the luminaire may already be identified uniquely on the basis of its blinking pattern. Then, the blinking pattern may also be communicated to the possible receivers via the network, and so these are able to expect said pattern synchronously in time with the emission. This additional information allows increased sensitivity of the reception and hence a more reliable and faster setup of the system. Furthermore, instead of, or in addition to, the address, the blinking pattern may contain information relating to a key for a secure connection and thus realize a diversity of a connection via the network or ensure a more secure two-factor authentication. If the sensors are video cameras, the luminaires may be activated and deactivated systematically in the case of time-synchronous recordings of a plurality of cameras, which generates additional information that makes the assignment of overlapping camera images easier.

The measurement results of the sensors are normalized and evaluated, by way of non-limiting example, by the sensor signal processing 1624. If a plurality of equivalent signals are available, these are still combined by means of sensor fusion 1622. The evaluated signals are transmitted to the lighting control system 3. Depending on the signal level, it is possible to derive a statement, by way of non-limiting example, as to which luminaires are arranged closest to the activated luminaire. Furthermore, a sound signal may be emitted at the same time as the blinking, by way of non-limiting example, and this may be recorded by the surrounding luminaires by means of a microphone. The difference in the time-of-flight between light signal and sound signal provides an indication about the distance between the luminaires. The Wi-Fi access points are likewise used for the evaluation since, in this case, it is also possible to make statements regarding the relative distance between the luminaires by means of the signal levels; in this respect, see, e.g., Robin. If cameras for detecting a presence are installed in a luminaire, these may also supply relatively reliable data, especially in conjunction with the LED modules 13 in active luminaire.

The algorithm activates and deactivates the actuators in the luminaires 1 in structured fashion and in each case measures with the fitting sensors of the other luminaires in order to generate all possible measurement values as quickly as possible.

Each combination of actuators/sensors, in which data of fitting sensors may be generated in the other luminaire during the operation of the actuators of the active luminaire, is referred to as measurement pair or measurement type. In the case of $n_L$ luminaires 1 and $n_M$ different types of measurements, $(n_L^2-n_L)*x*n_M$ measurements are necessary to be able to determine the assignment purely by computation.

In the lighting control system 3, all data are merged and evaluated by means of a suitable algorithm. Here, it is possible, furthermore, to evaluate data such as the absolute values of the measurement signals of the light sensors in order, by way of non-limiting example, to determine which of the luminaires 1 are situated in the proximity of a window. The algorithm running in the lighting control system 3 is described further below on the basis of FIGS. 11 to 15.

Once all data records are determined, the next step is carried out; it consists of evaluating the found data records in respect of how these fit to the given floorplan of the building and of determining which of the luminaires specified in the floorplan corresponds to the found luminaire such that the MAC address of the luminaire in fact installed at a given position may be assigned to each luminaire specified on the floorplan. Here, the found boundary conditions, such as the proximity to windows, by way of non-limiting example, is included in the algorithm in order to generate so much information that a unique assignment of the luminaires may be found.

To this end, the floorplan is interpreted to the effect of data records with addresses produced by the algorithm and the respective distances between the luminaires likewise being produced for all luminaires found on the plan.

Thereupon, the algorithm has available two lists, one produced from the floorplan and one measured/calculated using the aforementioned algorithm with the real MAC addresses of the luminaires 1. These two lists now have to be matched to one another such that an assignment of the data records that is as unique as possible and, hence, of the corresponding luminaires 1 from the two lists may be made.

In the first partial step, all possible distributions of the available MAC addresses are calculated for the physical installation locations in the floorplan and then, in the second step, the quotient of measured or calculated distance between two luminaires 1 and the calculated distance between two luminaires 1 from the floorplan is calculated.

If the assignment was correct, all calculated quotients should have substantially the same value; if this is not the case, the assignment is wrong in all likelihood. Thus, if the sum of the actual deviations of the quotients from the mean value of all quotients is greater than a predetermined value, the found distribution is wrong in all likelihood. This sum is a minimum in the case of the correct assignment; thus, a minimum search for this sum must be carried out in order to find the correct assignment.

Since over determinations occur for different measurement types, these may be used to verify the significance of the found result or to increase the significance in the case of two or more equal results in order to find the correct distribution.

If luminaires with an already known position may be included in the calculations and measurements, this may increase the search for the correct distribution and significantly increase the probability of having found the correct distribution.

If it is not possible to generate enough data records on account of the poor equipment state of the luminaires 1 with sensors and actuators, it is possible to generate the required information in a manual process, as a non-limiting example, by way of a mobile terminal such as a tablet or smartphone by virtue of a person running from luminaire to luminaire and generating the data records by way of sensors such as cameras and light sensors installed in the mobile terminal. Here, the communication with the method may be implemented via the Wi-Fi interface. Here, the algorithm predetermines the number of measurement captures necessary to be able to calculate the assignments.

In a further non-limited embodiment, the network switch in the luminaire is designed in such a way that it includes one or more antennas with directional effect. Here, the emission characteristics of the antennas are similar to those of the light of the luminaire.

Figure 5:
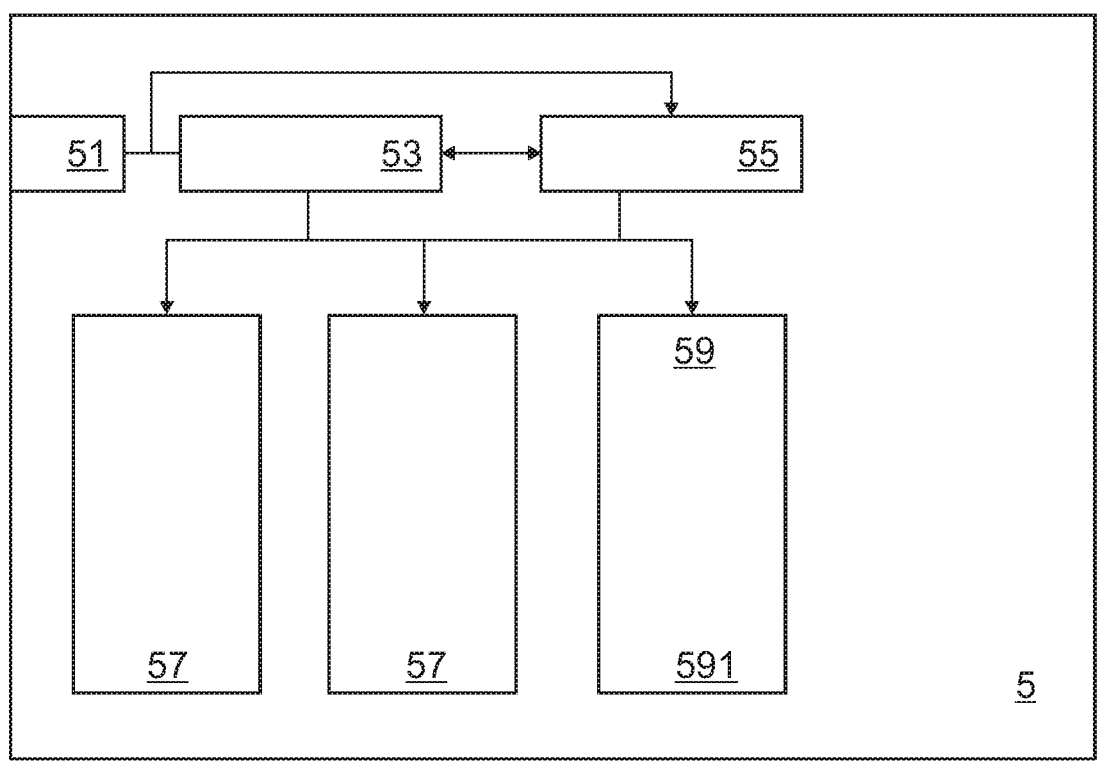
FIG. 5 shows a schematic illustration of a luminaire with a network link.

FIG. 5 shows a schematic illustration of a luminaire 5. The luminaire 5 has an input 51 for connecting a network with an integrated power supply. The integrated power supply is compatible with the PoE standard pursuant to IEEE 802.3af and 802.3at and with the future IEEE standard 802.3bt. In order to be able to use the power transmitted by the network, the luminaire 5 has a power supply unit 53, which separates electric power from the used signal and prepares the former for the components of the luminaire. The used signal of the network is supplied to a control unit 55, which processes the data. Here, pure network data, as a non-limiting example, from the Internet, are separated from control commands for the luminaire. The pure network data are transmitted to an access point 59, the control commands are carried out or transmitted to the two LED modules 57, which accordingly carry out the commands. The access point 59 operates a wireless network pursuant to the WLAN standard. In a further non-limiting embodiment, the access point additionally also operates as a ZigBee and/or a Bluetooth network. The access point has an antenna 591, by means of which the wireless network is operated. Here, the antenna is configured as a bi-quad antenna with a reflector, the emission characteristic adapted to the emission characteristic of the LED modules. Here, the two emission characteristics are substantially congruent, and so a good network coverage of the wireless network is also provided in the case of the uniform illumination of the room by way of a plurality of the luminaires.

In a non-limiting embodiment, the power connectors of each luminaire are dispensed with completely and each of the luminaires is supplied with power via a network cable, like in the embodiment above. Here, use is made of the power over Ethernet (PoE) standard pursuant to IEEE 802.3af or at, which has become relatively widespread in recent times. In the case of relatively large planar luminaires, use is also made of IEEE 802.3bt, which is still relatively new. The newer IEEE 802.3at standard allows a transmission of up to 25.4 W power via the network line. The coming IEEE 802.3bt standard will probably allow the transmission of at least 50 W power per network line. For modern LED luminaires, this is sufficient to ensure an excellent illumination quality. In general, it is possible to say that the proposed embodiment goes away from fewer luminaires equipped with large and powerful access points and toward better equipped luminaires, which are then supplied no longer over the mains grid but via PoE.

This solution has the advantage of significantly simplified cabling since it is only still necessary to lay one network cable to the respective luminaires and the luminaires then only need to be plugged-in by means of the known RJ-45 plug. Since the network lines only carry protective extra-low voltage, the installation may be carried out by anyone and, unlike mains voltage, need no longer be carried out by specially trained staff. Furthermore, the congruent emission characteristic may be exploited to achieve an improved automatic commissioning of the lighting system since the different characteristics of the radio network and of the light in the case of the same emission characteristic may be exploited. By way of non-limiting example, WLAN passes through ceilings and walls, while light does not. Using this, it is possible to determine, as a non-limiting example, whether luminaires are situated on the same floor or in the same room.

In the proposed embodiment, the access points 59, i.e., the network access points, too, are substantially less powerful as, of course, they only need to supply a significantly smaller area, which may be easily carried out with less power. In the case of modern access points, the assumption may be made that they only require less than 0.5 W in the sleep mode and only approximately one watt of power during operation. This may easily be brought about by way of PoE, even in addition to the power required for the illumination. Moreover, in the case of many small access points 59 in the luminaires 5, it is more probable that an access point is currently not being used and may be put into the power-saving sleep mode. Here, the power supply is brought about by a power unit 53 that is also connected to a control part 55, said control part separating the power supply from the data and, at the same time, interpreting and implementing control data for the luminaires contained in the data. Thus, this power unit 53 is connected between the input of the luminaire and the access point or a lighting module 57 of the luminaire. The lighting module 57 houses one or more light sources such as LEDs or LED modules. Here, the lighting module 57 has a certain light emission characteristic, as is conventional for luminaires of this type.

Figure 6:
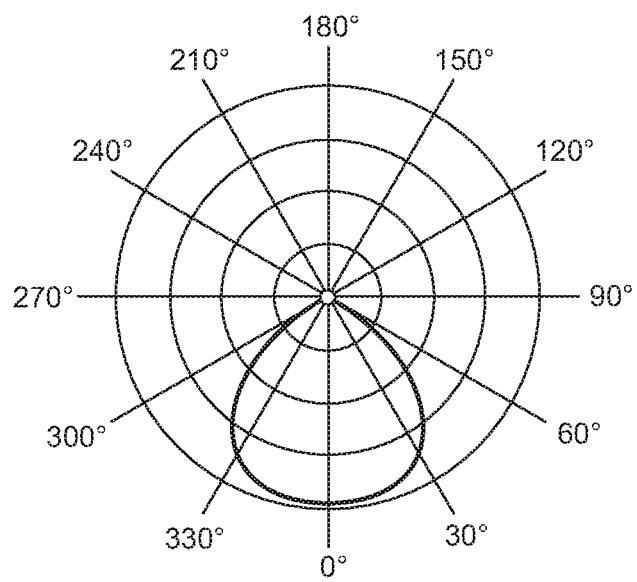
FIG. 6 shows an exemplary emission characteristic of a ceiling luminaire.

FIG. 6 shows the emission characteristic of such a light module. Depending on the design of the lighting system, the characteristic may be adapted and the emission angle of the lighting module may be selected accordingly. In the following non-limiting example, the luminaire has a relatively narrow, direct emission angle of only 30°. As a result, good illuminance below the luminaire may be achieved and the light distribution in the room is good despite the narrow emission angle in the case of an appropriate number of luminaires.

Now, the impressive part of the proposed embodiment is the fact that the access point installed in the luminaire has an emission characteristic which substantially corresponds to that of the lighting module. This provides the invaluable advantage that a light planner, who plans the lighting in a building, simultaneously plans an ideally designed WLAN network with this plan. This is because if the light planning yields a uniform illuminance in the room, this automatically also yields an excellent WLAN coverage or an excellent according coverage for a different radio network. In order to achieve this, the usually employed rod antennas are no longer sufficient. It is necessary to use antennas with an asymmetrical emission characteristic, such as bi-quad antennas, as a non-limiting example. Like the lighting modules, these have a reflector that focuses the radiation into a spatial hemisphere. Here, depending on the antenna form, emission characteristics emerge, which are congruent to those of the light. Naturally, the "lobe" cannot be exactly equal on account of the different wavelengths, but a good similarity, which is almost congruent, may be achieved.

Figure 7:
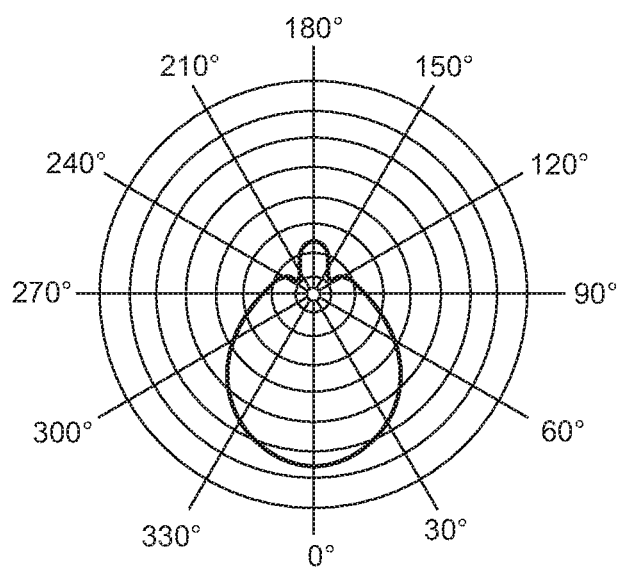
FIG. 7 shows the emission characteristic of a bi-quad antenna, as used in the non-limiting embodiment.
Figure 8:
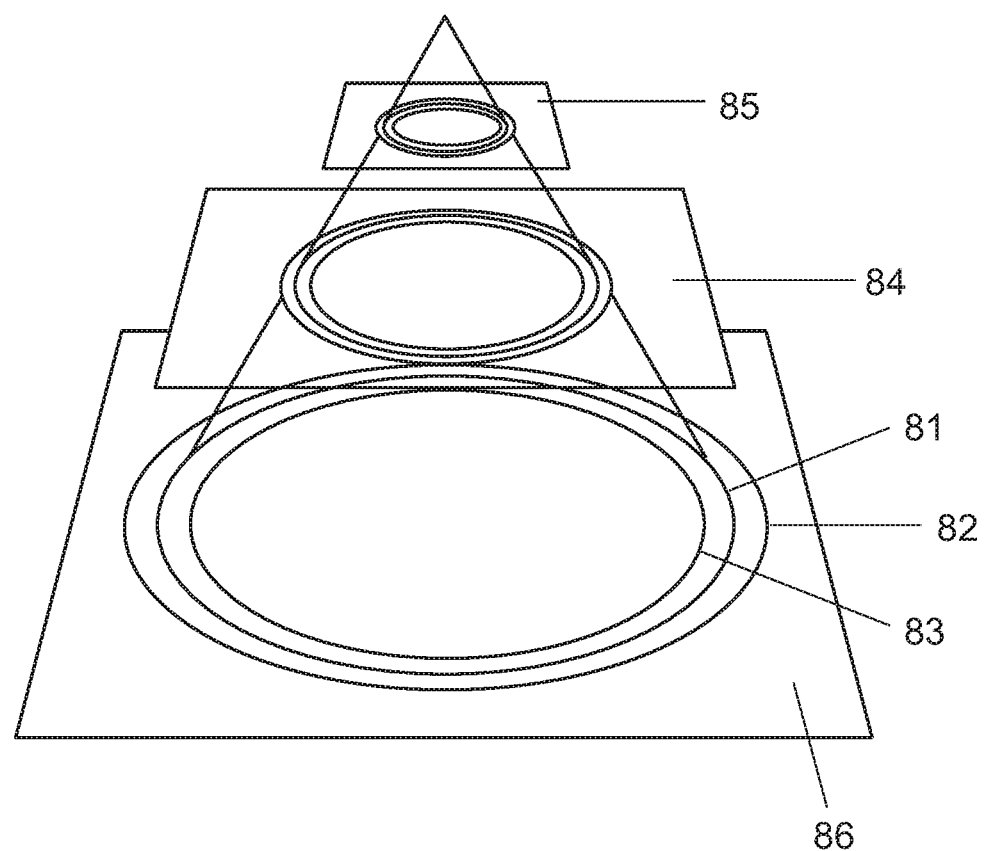
FIG. 8 shows an idealized conical emission characteristic of a ceiling luminaire with a 30° emission angle and the +−3° tolerance for the radio coverage.

FIG. 7 shows the emission characteristic of such a bi-quad antenna. In comparison with FIG. 6, it is clear that a very similar emission characteristic is provided here. In order to achieve this, each employed frequency band must, of course, use a dedicated antenna in order to facilitate congruence here. Here, an ideal model according to FIG. 8 is assumed, which shows an idealized emission cone of electromagnetic radiation. In this case, the cone has an emission angle of 30°. The central one 81 of the circles is the angle for the emitted light on the reference plane 86. The other two circles denote the +−3° line, corresponding to a tolerance of +−10%, within which the emission of the WLAN should be situated. Provided this is achieved, it is possible to speak of congruence between the light emission and the radio radiation. Naturally, this congruence must be related to a certain reference plane since the emission characteristics may be different in space. The reference plane 86, in which the circles are situated, is the floor in this case. However, this observation may also be made for other reference planes, e.g., reference planes 84 and 85. By way of non-limiting example, these planes may represent the heights of tabletops of office desks. In the case of modern height-adjustable office desks, there are, of course, at least two planes for each final position of the desk.

Should use likewise be made of the 60 GHz frequency band for WLAN, a different procedure in the antenna design is necessary on account of the significantly different frequency in relation to the two established bands at 2.4 GHz and 5 GHz. Here, it is not possible to work with a simple bi-quad antenna. Since the range in the 60 GHz range is very low on account of the extremely high frequency, it is necessary to work here with antenna designs with a very high gain and directional effect. This may be brought about using a MIMO antenna array. Using this MIMO array, space-time coding is achieved, in which each information item is transmitted via a dedicated antenna, by means of which an optimal transmission to the subscriber is possible. Thus, the location of the subscriber is included in the transmission path.

Figure 9:
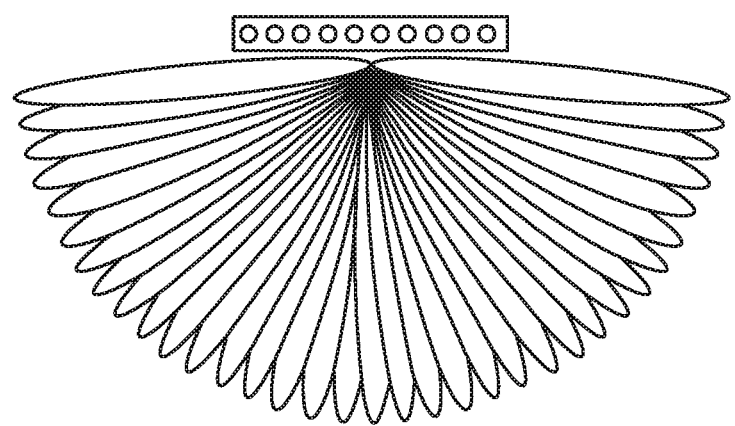
FIG. 9 shows the principle of beamforming for a radiofrequency wireless network by means of a MIMO antenna array.

FIG. 9 shows emission characteristics of the various antennas in such a MIMO array. The emission is tightly focused in order to obtain an antenna gain that is as high as possible. Depending on the location of the subscriber, the antenna at which the greatest field strength may be achieved with the appliance of the subscriber is now activated.

Figure 10:
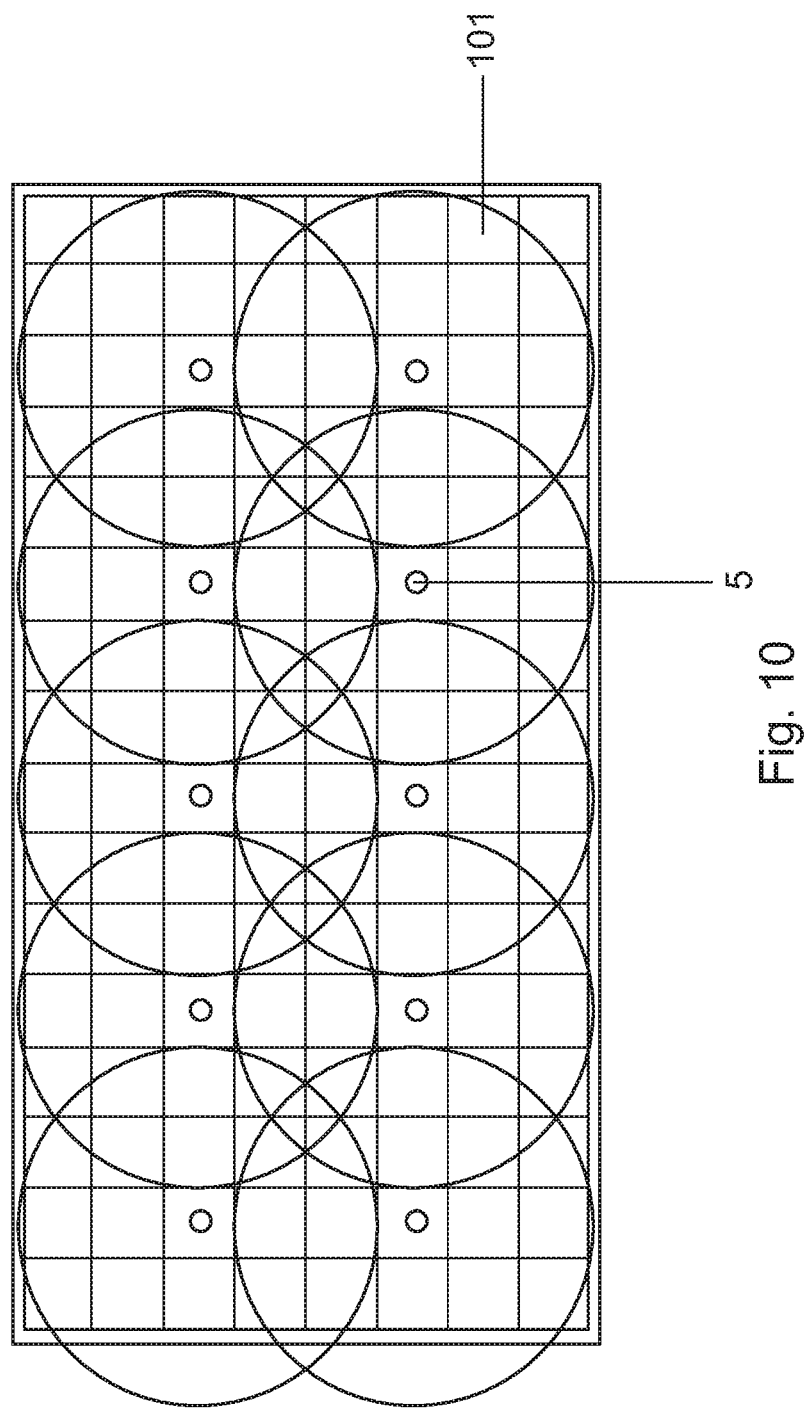
FIG. 10 shows an installation in a rectangular room according to a non-limiting embodiment.

FIG. 10 now shows, in an exemplary manner, a room with the proposed lighting installation. In this room, there are 16×8 ceiling panels in the dropped ceiling at a height of 2.8 m, for example as is usual in the USA. Respectively one luminaire 5 is installed in 10 of these ceiling panels. The circle around each of these luminaires denotes the area covered by the light and by the WLAN. It may clearly be seen that the coverage with a good illuminance is excellent and, at the same time, a good coverage of the radio network is achieved. Since the full width at half maximum of the signal strength forms the basis for the planning in the drawing here, a signal of the cell should naturally also be expected outside the plotted regions. Using a suitable rasterization of the channels, interference of adjacent cells may be prevented here.

FIGS. 11 to 15 schematically show a possible procedure of the method for automatically setting up a lighting system, as already described roughly in FIGS. 1 to 4 above. This method is carried out in the lighting control system 3 and in many cases allows a fully automatic setup of a newly installed lighting system. Even if the setup cannot be carried out completely automatically on account of missing data, the manual interaction for setting up the lighting system is reduced to a minimum and it may be carried out easily and quickly. Hence, overall, a very cost-effective setup of a newly installed lighting installation is possible.

Figure 11:
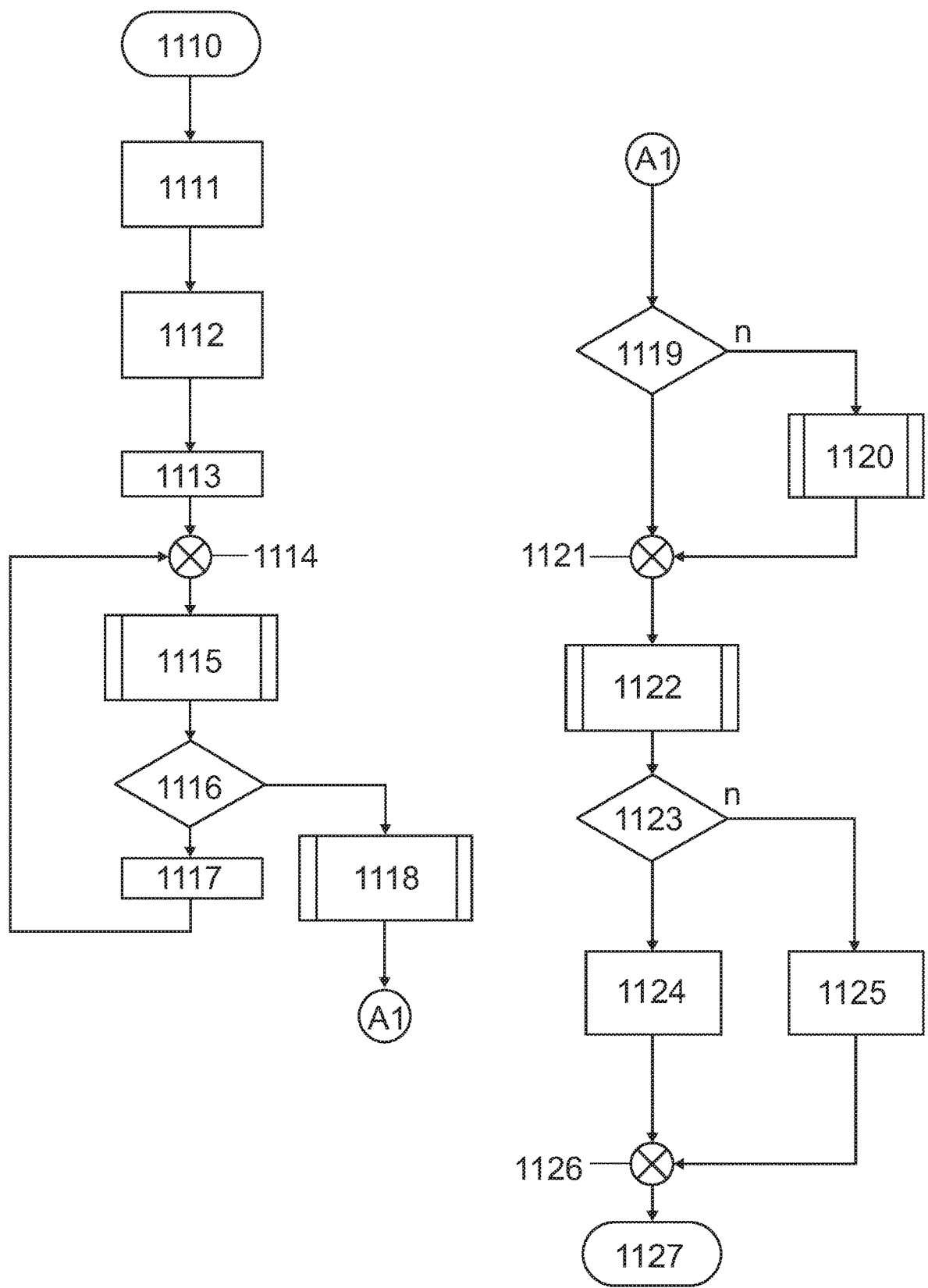
FIG. 11 shows a flowchart of a non-limiting embodiment of a method for automatically setting up a lighting system.

FIG. 11 shows a flowchart of the method. The method starts at point 1110. In the first step 1111, all components present in the system are identified by the lighting control system 3. By way of non-limiting example, this may be brought about by way of a broadcast command of the lighting control system 3 to all appliances situated in the network. Each of these appliances, be it an actuator 14, sensor 15, network switch 2, 110 or luminaire 1 or 5, transmits its unique ID back to the lighting control system 3. By way of non-limiting example, this may be the MAC address of the appliance. The network switches 2, 110, too, have a unique ID. The network switches are queried separately and supply in response the unique IDs of the appliances connected thereto. On the basis of these IDs, the lighting control system 3 combines the appliances connected to a network switch 2, 110 in substructures in the step 1112, since the probability is high that these appliances are also installed with not a great distance from one another in space. In step 1113, a loop is entered, which passes through all substructures. A start is made at the first substructure and the loop has worked through until the last substructure.

Step 1114 is the starting point of the loop, which is returned to repeatedly for as long as there are substructures that have not yet been worked though. In step 1115, the spatial neighborhood relations of the substructure are established; this step is explained in detail in FIG. 13. In step 1116, a check is carried out as to whether all n substructures have been worked through, i.e., whether the counter n reflects the number of substructures in the system. If this is not the case, the counter n is incremented by one in step 1117 and the loop 1114, 1115, 1116 is run through again. Should this be the case, the neighborhood relations of all appliances of all substructures are established in step 1118, since only the neighborhood relations in the respective substructure, of course, were established until now.

Then, a check is carried out in step 1119 as to whether a floorplan was already stored in the lighting control system 3. If this is not the case, the lighting control system 3 creates a floorplan in step 1120 and then proceeds to point 1121; should a floor plan already be present, the lighting control system immediately goes to point 1121. Step 1120 is explained in more detail in FIG. 12. In step 1122, the found neighborhood relations are then compared to the floorplan and, as a result thereof, the components are assigned to an installation space in the floor plan. This step is explained in detail in FIG. 14. Finally, a check is carried out in step 1123 as to whether a system configuration is already present. By way of non-limiting example, stored in a system configuration is which components such as luminaires are controlled by what components such as light switches. If a system configuration is present, it is implemented in the system on the basis of the found neighborhood relations and on the basis of the floorplan in step 1124 and a jump is made to point 1126. If no configuration is present, a basic configuration is implemented in step 1125, in which, e.g., all switches situated in a room actuate all luminaires, and thereafter there is a jump to point 1126. Consequently, the end of the commissioning is reached in step 1127.

Figure 12:
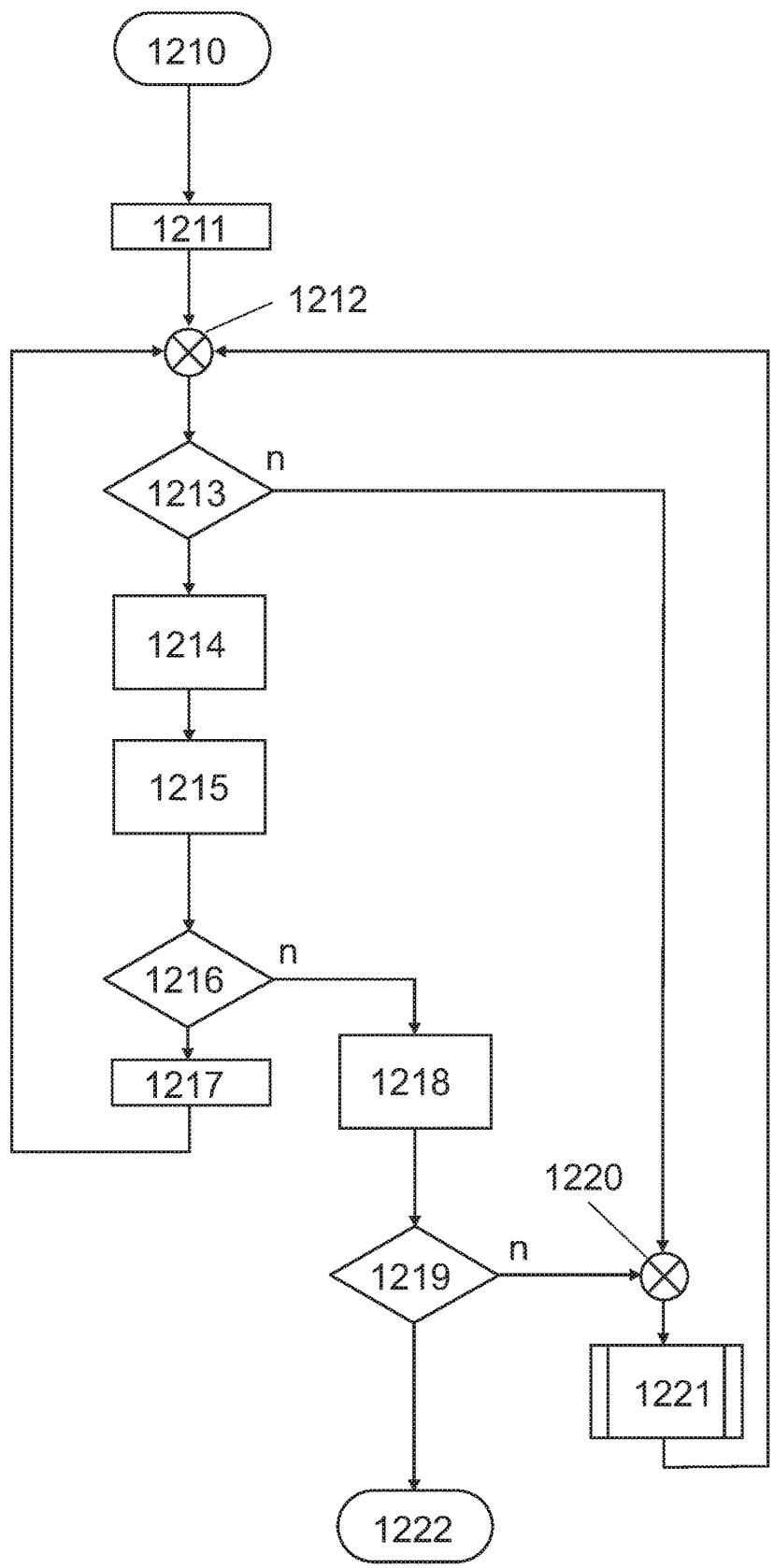
FIG. 12 shows a flowchart of a subroutine for creating a floorplan.

FIG. 12 shows a flowchart for the "create floorplan" subroutine. A floorplan is the plan of a floor of a building which includes the contours of the walls and, where necessary, the positions and addresses of the appliances, to the extent that these are already known from neighborhood relations. Such a floorplan is a result of the "create floorplan" subroutine.

The subroutine starts at point 1210. Here too, there is a routine which runs through all substructures in order to make the algorithm more reliable and more robust.

A start is made in the substructure 1, the return point 1212 is skipped and a check is carried out in a query 1213 as to whether camera sensors are present in the substructure. If this is the case, all stored camera images are retrieved in step 1214 and transmitted to the lighting control system 3. Optionally, the creation of further images is initiated by the lighting control system 3. By way of the image content, there may also be a suitable pre-positioning of the camera sensors at the same time. The images are checked for overlap by the lighting control system 3 in an internal algorithm in step 1215 and assembled as far as possible to an overall image. This assembling is known from, e.g., Google Street View or from the creation of panoramic photos. Additionally, programs such as Hugin have the routines requires to assemble the images in an overall image.

Once the overall image of the substructure has been assembled, an image processing algorithm is used, the latter analyzing the overall image of the substructure and extracting the structures such as walls and other constructional peculiarities and creating an interpretable floorplan therefrom. The camera sensors, too, are pre-positioned in the plan on the basis of the image content supplied thereby.

If the query 1213 determines that no further substructures are present, a jump is made to point 1220. The further procedure after point 1220 is explained below.

In a query 1216, a check is made as to whether further substructures are present. If this is a case, there is a return to point 1212 again and the routine for capturing the substructures with steps 1213, 1214 and 1215 is run through again.

Once all substructures have been worked through, a jump is made in the query 1216 to step 1218, in which all substructure images, in turn, have already been assembled using the stitching algorithm used in the substructure routine. Here, too, the structures such as walls, doors, etc., are extracted in the resulting overall image by means of the image processing algorithm and the positions of the camera sensors are inserted into the floorplan. Then, a query is made in query 1219 as to whether the overall image is complete or whether there still are "white spots" i.e., whether gaps are present in the image. This may likewise be determined by the image processing algorithm. If no gaps are present in the image, the floorplan is complete and the subroutine is terminated in point 1222. If the image is not complete, manual assistance is necessary and a jump is made to point 1220. From point 1220, the subroutine 1221 is started, the latter describing the process of the manual assistance of the commissioning. After the manual assistance, there is again a jump back to point 1212 and the process of creating the floorplan is continued automatically.

The floorplan created by photography or manually does not necessarily need the positions of all appliances. If a sufficient number of consistent neighborhood relations are present, a system may also be commissioned without complete knowledge of all positions of all appliances (e.g., older building, not all positions of the luminaires are known exactly, commissioning carried out by the substructure association).

Figure 13:
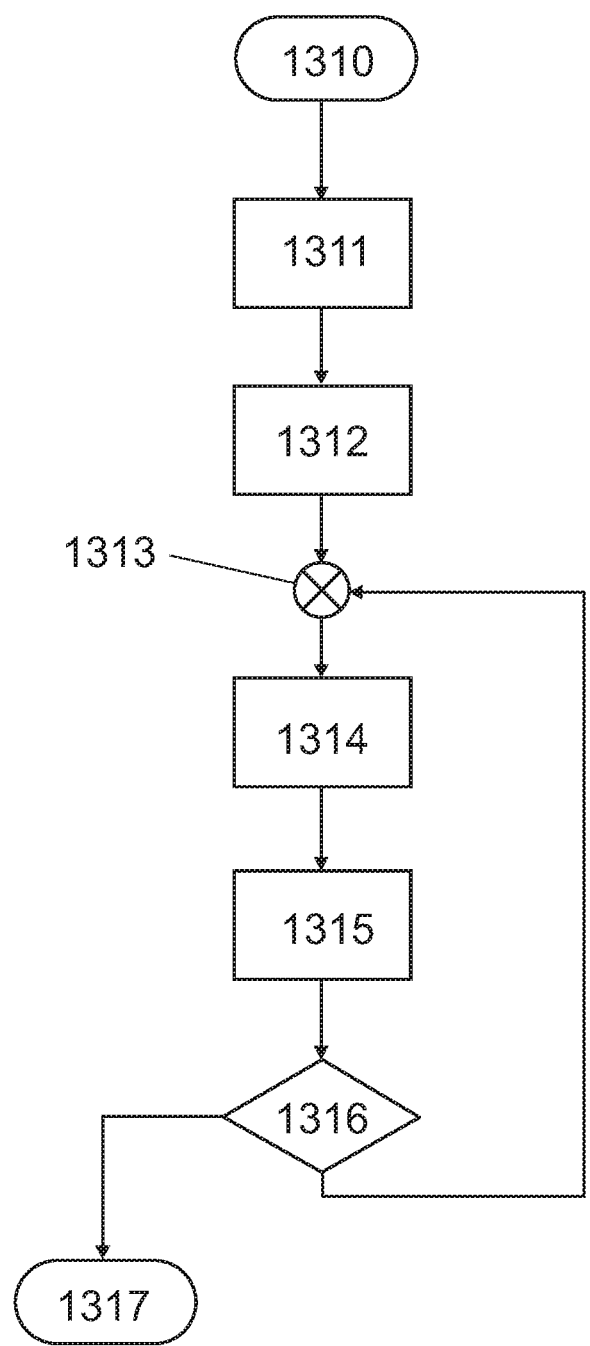
FIG. 13 shows a flowchart of a subroutine for establishing the neighborhood relations between the various appliances in the system.

FIG. 13 shows the flowchart of the "establish neighborhood relations" subroutine. The goal of this subroutine is a map with all components present in the system. The map shows the positioning and the distances of the individual components. Further, as a secondary result, further information arises in relation to the floorplan, such as windows, which possibly could not be found in the "create floorplan" subroutine. Sensor-actuator pairs, which supply important information, are used as resources for this subroutine. Sensor-actuator pairs may be, as a non-limiting example, two Wi-Fi access points, of which one is operating in transmission mode and one is operating in reception mode. Further sensor-actuator pairs are light sensor-lighting module, camera-lighting module, microphone-loudspeaker, or else two cameras whose images overlap. Other wireless radio protocols, too, may be used to generate neighborhood information, provided these are available.

The goal lies in collecting as much information as possible in order to have a greatly overdetermined system, which reaches more robustness and reliability by means of data fusion.

The subroutine starts at point 1310. Suitable sensor-actuator pairs are established in step 1311. Here, each sensor and each actuator may be used multiple times in various pairs, should this appear expedient and increase the amount of information. In step 1312, a table containing all sensor-actuator pairs and, with this, the relative distances between sensor and actuator is created. At the return point 1313, an optimization loop is started, in which a first map, which contains all measured components, i.e., sensor-actuator pairs, is created in point 1314. In step 1315, the created map is then checked for singularities. By way of non-limiting example, these could be non-fitting distance data of two appliances, which arose on account of reflections at walls. If a sufficient number of data records are present, these "irregularities" may be remedied in step 1315 and the map may be further improved by virtue of missing wall parts, etc., being inserted. By means of the radio-based and light-based sensor-actuator pairs, it is possible to determine walls particularly well and the position of the walls in the map may be checked.

In the query 1316, the quality of the map is determined using an algorithm. In general, the optimization loop is run through a number of times since the map is initially modified again and again, making a new calculation of the data necessary. Therefore, there is a return to the return point 1313 in the case of an insufficient quality and the loop with steps 1314 and 1315 is run through again. If the new map is better than the previous map, the optimization loop is run through again. The "establish neighborhood relations" subroutine is only terminated in point 1317 if no improvement between the previous and the current map may be determined anymore in this step.

Figure 14:
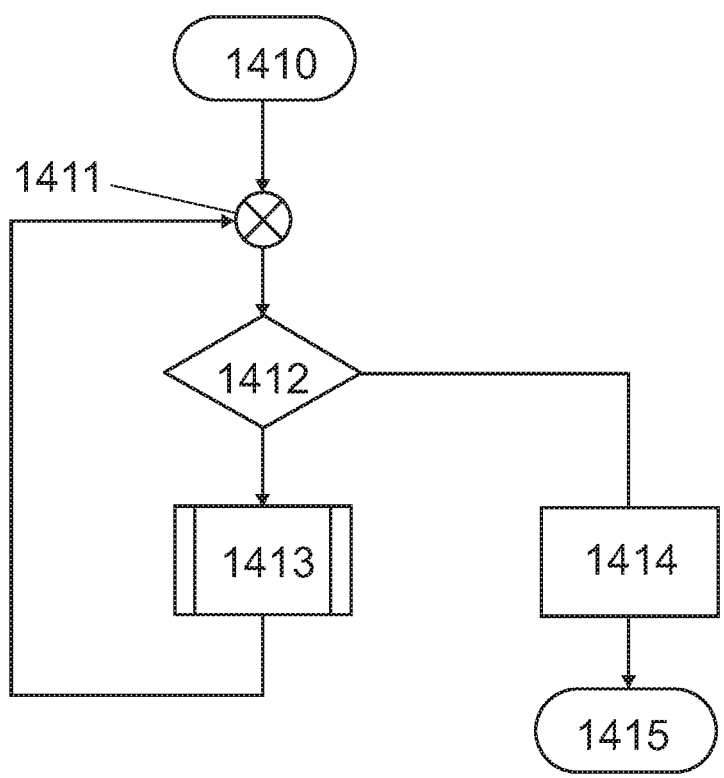
FIG. 14 shows a flowchart of a subroutine for aligning the established plan with the neighborhood relations and the created or available floorplan.

FIG. 14 describes the subroutine in which the calculated plan of the components in relation to one another is compared to the available floorplan or the floorplan created in step 1120. The goal of this subroutine is to have, by the end, a floorplan in which all components present in the system are plotted with position and address.

The subroutine starts at point 1410, jumps over the return point 1411 and goes to the first query 1412, in which there is a query as to whether there still are appliances in the system for which no neighborhood relations are available. If this is the case, there is a branch into the "manual assistance of commissioning" subroutine, in which the appliances are made out in terms of location and the neighborhood relations are established.

If data are available for all appliances, there is branching in the query 1412 to step 1414, in which the two plans are compared to one another and the most probable configuration of the appliances in the floor of the building is established using a method, which may likewise be iterative. Once the most probable configuration has been found, this subroutine ends in point 1415.

Figure 15:
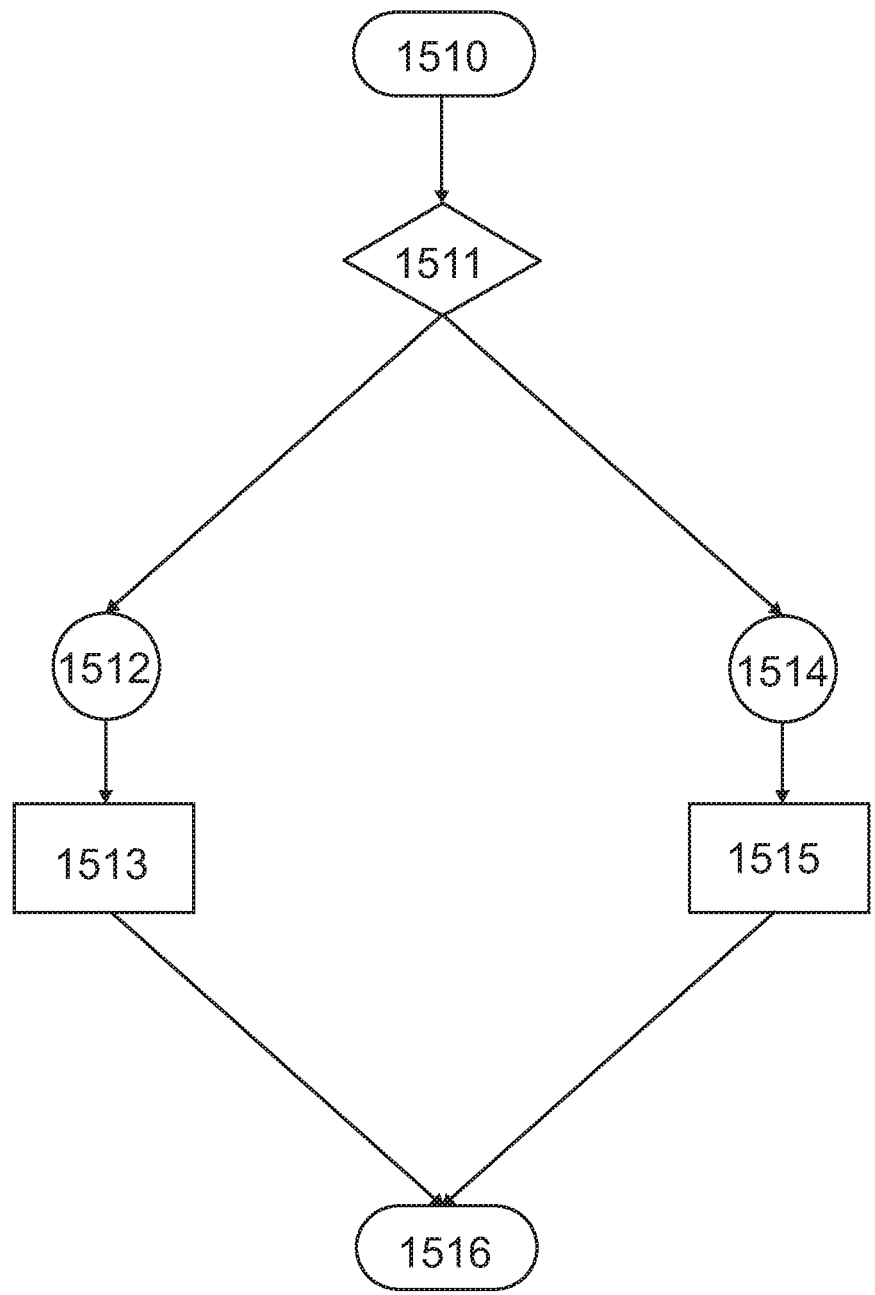
FIG. 15 shows a flowchart of a partial method for manual assistance of the method for automatically setting up lighting system.

Finally, FIG. 15 describes the subroutine or the partial method of the manual assistance of the method for automatically setting up a lighting system if a completely automatic setup is not possible due to lack of data and information. It is the goal of the method to minimize any manual intervention; however, it is often not possible to dispense with some manual steps. Particularly in the case of "refurbishing" older buildings, some manual steps will often be necessary.

The sub-method starts at point 1510 and then proceeds to query 1511, in which the type of manual intervention that is necessary is determined. There is a portion dedicated to creating/complementing the floorplan and a portion that complements the neighborhood relations of a few components in order to have sufficient data for the automatic assignment method.

Should a floorplan be created or complemented, there is branching to the point 1512. Missing images are created in step 1513 in order to have a complete image replacement for the automatic creation of the floorplan. If no images at all have been available until now, then it is also possible to immediately create the floorplan manually and load it into the lighting control system 3. After step 1513, this portion has been worked through and the sub-method is terminated in point 1516.

If the necessity of the manual component comparison is determined in query 1511, there is branching to point 1514 and step 1515 is subsequently carried out. The latter contains the manual establishment of neighborhood relations of components that have previously not been captured or of components for which too few data were available previously. To this end, it is necessary to identify the appliances in the floor of the building that are only known in terms of their (MAC) address. In the case of actuators, these may be queried and light may be emitted or sound may be emitted. A person wanders across the floor until they have found the actuator and then sets the neighborhood relations, as a non-limiting example, by means of an app on a mobile appliance. By means of the app, said neighborhood relations may be immediately transmitted to the lighting control system 3. In the case of sensors, the person themselves must use a suitable actuator in order to be able to capture the emitted signal of the sensor. Here, too, the person wanders along the floor and learns, as a non-limiting example, via the mobile app, whether the sensor receives the emitted signal. By way of the strength of the reception signal, the person may be guided to the relevant sensor and may determine the neighborhood relations there. The relevant signal may likewise be emitted via the mobile appliance, on which the app runs. Mobile parts such as cellular telephones have most necessary actuators and also sensors onboard; consequently, the manual partial method may be carried out very easily and quickly by means of a mobile appliance.

Once the neighborhood relations of all missing appliances have been established and the database in the lighting control system 3 is completed, step 1515 is terminated and the partial method is consequently likewise terminated in point 1516.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

LIST OF REFERENCE SIGNS 1, 5 Luminaire
2 PoE switch
3 Lighting control system
4 Supply network 6 Door
7 Window
8 Overarching floor switch
11 Power-over-Ethernet-capable network interface
110 Network switch in the network interface
12 Power supply
13, 57 LED modules with optics and drivers
14 Actuators
15 Sensors
16 Data processing unit
161, 59 Wi-Fi access point, network access point
162 Operating system
1621 Power regulation
1622 Sensor fusion
1623 Ethernet management
1624 Sensor signal processing
1625 Operation of the Wi-Fi access point
1626 Light controller
211 Injector
221 Power unit
21, 22 Gateways and control computers for the lighting installation
DS Distribution network, internal network
AP #1 . . . AP #N Access points
BSS #1 . . . BSS #N Basis service sets for subscribers on the wireless LAN (WLAN) network
41 Network access points in the luminaires
42 Radio holes
81 Light emission circle of a luminaire on the floor as a reference plane
82 +3° (10%) tolerance line of the emission surface of the radio network
83 −3° (10%) tolerance line of the emission surface of the radio network
84 Reference plane
85 Reference plane
86 Floor reference plane
101 Ceiling panels with dimensions of 625 mm×625 mm
51 Input for connection to a network
53 Power supply unit
55 Control unit
591 Antenna

The invention claimed is:

1. A method for setting up a lighting system comprising a multiplicity of luminaires and a plurality of network switches, which are part of a network and each have a unique network address, wherein each luminaire is connected to a network switch, wherein subsections of the multiplicity of luminaires each have at least one sensor and each luminaire has an actuator, wherein each network switch of the plurality of network switches is a power over Ethernet (PoE) switch that provides power to the respective subsection of luminaires assigned to that PoE network switch;

the method comprising:
querying the unique network address of each network switch to determine which luminaire is connected to which network switch for forming the subsections of the multiplicity of luminaires, wherein each luminaire is assigned to exactly one subsection and each subsection is assigned to one network switch,
measuring a relative distance between two luminaires in each case by reading the at least one sensor of the at least one luminaire equipped with the at least one sensor while simultaneously activating the at least one actuator of the other luminaire,
producing at least one data record, wherein each data record contains the network address of the two luminaires, the employed sensor/actuator pairing and the relative distance of the luminaires from one another, and
merging the at least one data record to form a geo-localized network list and comparing the network list to a floorplan underlying the lighting system in order to determine a physical location of each luminaire.

2. The method as claimed in claim 1, wherein all the luminaires in a subsection are connected to the network switch assigned to the respective subsection.

3. The method as claimed in claim 1, wherein one or more luminaires equipped with the sensors have a network interface with a further network switch, to which the sensors and the actuators assigned thereto are connected.

4. The method as claimed in claim 1 wherein, for the purposes of measuring the distance between the two luminaires, the at least one actuator of the luminaire is operated while the sensors of the remaining luminaires equipped with the sensors measure simultaneously and the relative distance between the two luminaires is calculated from the measurement results by means of data fusion.

5. The method as claimed in claim 4, wherein the sensors measure a light measurement, and the ambient brightness is incorporated in the calculation in order to determine a measure for the spatial proximity of the luminaire to a window.

6. The method as claimed in claim 4, wherein for the purposes of determining the distance in the case of luminaires appropriately equipped with sensors, a light sensor and a microphone are operated as at least one sensor and at least one light module and one loudspeaker is operated as at least one actuators to determine the relative distance between two luminaires using the time-of-flight difference between light signal and sound signal.

7. The method as claimed in claim 1, wherein in the case of an insufficient number of evaluable data records, the method further comprises:
manually producing additional data records with a mobile terminal with the sensors and the actuators in order to be able to calculate all neighborhood relations that are required for the complete assignment of luminaires to a counterpart of the luminaire in the floorplan, wherein the insufficient number of evaluable data records is present if it is not possible to assign all the luminaires to the counterpart of the luminaire in the floorplan with the neighborhood relations.

8. The method as claimed in claim 7, wherein the physical location of the mobile terminal is determined manually for the measurement in relation to the floorplan.

9. The method of claim 1, wherein the unique network address of each network switch is a MAC address.

10. A luminaire for inclusion in a lighting system, wherein the luminaire is included in a network with a unique network address, wherein the luminaire takes part in a method for setting up the lighting system comprising a multiplicity of luminaires and a plurality of network switches, which are part of the network and each have a unique network address, wherein each luminaire is connected to a network switch, wherein subsections of the multiplicity of luminaires each have at least one sensor and each luminaire has an actuator, wherein each network switch of the plurality of network switches is a power over Ethernet (PoE) switch that provides power to the respective subsection of luminaires assigned to that PoE network switch;

for the purposes of setting up the lighting system;
the method comprising:

querying the unique network address of each network switch to determine which luminaire is connected to which network switch for forming the subsections of the multiplicity of luminaires, wherein each luminaire is assigned to exactly one subsection and each subsection is assigned to one network switch, measuring a relative distance between two luminaires in each case by reading the at least one sensor of the at least one luminaire equipped with the at least one sensor while simultaneously activating the at least one actuator of the other luminaire, producing at least one data record, wherein each data record contains the network address of the two luminaires, the employed sensor/actuator pairing and the relative distance of the luminaires from one another, and merging the at least one data record to form a geo-localized network list and comparing the network list to a floorplan underlying the lighting system in order to determine a physical location of each luminaire.

11. The luminaire as claimed in claim 10, wherein the luminaire is included in the network via a network interface and the luminaire simultaneously obtains power for operation via the network interface.

12. The luminaire as claimed in claim 10, further comprising a further network switch, at which the components assigned to the luminaire, are connected and addressable via a network interface.

13. The luminaire as claimed in claim 12, wherein components assigned to the luminaire are the sensors, and wherein the sensors are brightness sensors, radio reception modules, microphones or cameras.

14. The luminaire as claimed in claim 12, wherein the components assigned to the luminaire are the actuators, and wherein the actuators are light modules, radio transmitters or loudspeakers.

15. The luminaire as claimed in claim 13, wherein the radio reception modules and radio transmitters form a wireless LAN access point pursuant to the IEEE 802.11 standard or a Zigbee module pursuant to the IEEE 802.15.4 standard or a Bluetooth module pursuant to the IEEE 802.15 standard.

16. A lighting control system for controlling a lighting system, comprising a method for setting up the lighting system comprising a multiplicity of luminaires and a plurality of network switches, which are part of the network and each have a unique network address, wherein each luminaire is connected to a network switch, wherein subsections of the multiplicity of luminaires each have at least one sensor and each luminaire has an actuator, wherein each network switch of the plurality of network switches is a power over Ethernet (PoE) switch that provides power to the respective subsection of luminaires assigned to that PoE network switch; the method comprising:

querying the unique network address of each network switch to determine which luminaire is connected to which network switch for forming the subsections of the multiplicity of luminaires, wherein each luminaire is assigned to exactly one subsection and each subsection is assigned to one network switch, measuring a relative distance between two luminaires in each case by reading the at least one sensor of the at least one luminaire equipped with the at least one sensor while simultaneously activating the at least one actuator of the other luminaire, producing at least one data record, wherein each data record contains the network address of the two luminaires, the employed sensor/actuator pairing and the relative distance of the luminaires from one another, and merging the at least one data record to form a geo-localized network list and comparing the network list to a floorplan underlying the lighting system in order to determine a physical location of each luminaire.

* * * * *